United States Patent [19]
Nelson

[11] Patent Number: 5,487,204
[45] Date of Patent: Jan. 30, 1996

[54] WINDSHIELD WIPER WITH DEICER

[76] Inventor: Steven M. Nelson, 717 2nd St., NW., Pipestone, Minn. 56164

[21] Appl. No.: 345,605

[22] Filed: Nov. 28, 1994

[51] Int. Cl.⁶ .................. B60S 1/32; B60S 1/04
[52] U.S. Cl. .................. 15/250.19; 15/250.202; 15/250.351; 15/250.21
[58] Field of Search ............ 15/250.19, 250.20, 15/250.35, 250.40, 250.16, 250.17, 250.21

[56] References Cited

U.S. PATENT DOCUMENTS

| | | | |
|---|---|---|---|
| 2,784,438 | 3/1957 | Petersen | 15/250.19 |
| 3,082,026 | 3/1963 | Anderson | 15/250.34 |
| 3,263,261 | 8/1966 | Schulz | 15/250.35 |
| 5,274,875 | 1/1994 | Chou | 15/250.19 |

FOREIGN PATENT DOCUMENTS

| | | | |
|---|---|---|---|
| 2652325 | 3/1991 | France | 15/250.35 |
| 299957 | 12/1990 | Japan | 15/250.20 |

*Primary Examiner*—Gary K. Graham

[57] ABSTRACT

A windshield wiper assembly including a wiper deicer for eliminating the build-up of snow and ice on a windshield wiper blade thereof. The assembly comprising a first support bracket secured to the windshield wiper; a second support bracket having a spline thereon, a support rod having a first end secured to the first support bracket; a hollow electrical solenoid casing receiving a second end of the support rod, a wiper seal and scraper secured within the casing adjacent the second end of the support rod, a pivot rod pivotally secured to the second support bracket; and an electrical solenoid secured within the hollow electrical solenoid casing, the electrical solenoid secured to the second end of the support rod, a wire electrically secured to the solenoid and extending outwardly thereof to a push button mechanism. Power may be applied to the device by other sources such as an air cylinder as for vehicles with diesel engines, whether a truck, bus or the like.

2 Claims, 4 Drawing Sheets

WINDSHIELD WIPER WITH DEICER

BACKGROUND OF THE INVENTION

1. Field of the Invention

The present invention relates to a new and improved mechanical wiper deicer and, more particularly, pertains to Eliminating the build-up of snow and ice on a windshield wiper blade with a mechanical wiper deicer.

2. Description of the Prior Art

The use of windshield wipers is known in the prior art. More specifically, windshield wipers heretofore devised and utilized for the purpose of cleaning a windshield are known to consist basically of familiar, expected, and obvious structural configurations, notwithstanding the myriad of designs encompassed by the crowded prior art which has been developed for the fulfillment of countless objectives and requirements.

The prior art discloses a large number of windshield wipers. By way of example, U.S. Pat. No. 5,140,719 to Cowan discloses a vehicle window cleaning device.

U.S. Pat. No. 5,107,563 to Zimmerman et al. discloses non-stick windshield wipers.

U.S. Pat. No. 4,805,323 to Motohashi discloses a snow removal device for vehicles.

U.S. Pat. No. 5,056,183 to Haney, III discloses a windshield wiper blade.

Lastly, U.S. Pat. No. 4,145,788 to Ferrarelli discloses an ice shield.

In this respect, the mechanical wiper deicer according to the present invention substantially departs from the conventional concepts and designs of the prior art, and in doing so provides an apparatus primarily developed for the purpose of eliminating the build-up of snow and ice on a windshield wiper blade with a mechanical wiper deicer.

Therefore, it can be appreciated that there exists a continuing need for a new and improved mechanical wiper deicer which can be used for eliminating the build-up of snow and ice on a windshield wiper blade with a mechanical wiper deicer. In this regard, the present invention substantially fulfills this need.

SUMMARY OF THE INVENTION

In view of the foregoing disadvantages inherent in the known types of windshield wipers now present in the prior art, the present invention provides a new and improved mechanical wiper deicer. As such, the general purpose of the present invention, which will be described subsequently in greater detail, is to provide a new and improved mechanical wiper deicer and methods which have all the advantages of the prior art and none of the disadvantages.

To attain this, the present invention essentially comprises a new and improved mechanical wiper deicer for eliminating the build-up of snow and ice on a windshield wiper blade comprising, in combination, a wiper bracket having a first end, a second end, and an intermediate extent therebetween, the first end rotatably secured to a car adjacent the windshield thereof, a retention spring securing the first end to the intermediate extent, a wiper blade attachment secured to the second end; a first support bracket having an upper portion and a lower portion, the lower portion secured to the intermediate extent of the wiper bracket, the upper portion comprising a first support and a second support, the first support and the second support having aligning apertures therethrough; a second support bracket having an upper portion and a lower portion, the lower portion having a U-shaped spline thereon, the U-shaped spline adapted for securement to the first end of the wiper bracket, the upper portion having a first support and a second support, the first support and the second support having aligning apertures therethrough; a support rod having a first end and a second end, the first end having an aperture formed therethrough, the first end secured between the first support and the second support of the upper portion of the first support bracket by a fastening means through the aperture of the support rod and the aligning apertures of the first support and the second support; a hollow electrical solenoid casing having an open first end and a closed second end, the open first end receiving the second end of the support rod, a wiper seal and scraper secured within the open first end adjacent the second end of the support rod, a pivot rod having a first end and a second end, the first end secured to the closed second end, the second end pivotally secured to the first support and the second support of the upper portion of the second support bracket by a fastening means through the aligning apertures thereof and the second end of the pivot rod; an electrical solenoid secured within the hollow electrical solenoid casing, the electrical solenoid comprising a shaft, a movable core situated within the shaft, the movable core having a first end, a second end, and an intermediate extent therebetween, the first end secured to the second end of the support rod, a charged coil electrically secured to the shaft, a wire having a first end and a second end, the first end electrically secured to the charged coil, the second end extending outwardly of the solenoid casing; a push button mechanism secured on an inside portion of the car thereby being accessible to a driver, the push button mechanism electrically secured to the second end of the wire of the electrical solenoid; and a protective cover removably secured to the first support bracket and the second support bracket, the protective cover functioning to protect the electrical solenoid.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved mechanical wiper deicer which has all the advantages of the prior art windshield wipers and none of the disadvantages.

It is another object of the present invention to provide a new and improved mechanical wiper deicer which may be easily and efficiently manufactured and marketed.

It is a further object of the present invention to provide a new and improved mechanical wiper deicer which is of a durable and reliable construction.

An even further object of the present invention is to provide a new and improved mechanical wiper deicer which is susceptible of a low cost of manufacture with regard to both materials and labor, and which accordingly is then susceptible of low prices of sale to the consuming public, thereby making such a mechanical wiper deicer economically available to the buying public.

Still yet another object of the present invention is to provide a new and improved mechanical wiper deicer which provides in the apparatuses and methods of the prior art some of the advantages thereof, while simultaneously overcoming some of the disadvantages normally associated therewith.

Even still another object of the present invention is to eliminate the build-up of snow and ice on a windshield wiper blade with a mechanical wiper deicer.

Lastly, it is an object of the present invention to provide a mechanical wiper deicer for eliminating the build-up of snow and ice on a windshield wiper blade comprising a first support bracket secured to the windshield wiper; a second support bracket having a U-shaped spline thereon, the U-shaped spline adapted for securement to the wiper bracket; a support rod having a first end secured to the first support bracket; a hollow casing receiving a second end of the support rod, a wiper seal and scraper secured within the casing adjacent the second end of the support rod, a pivot rod pivotally secured to the second support bracket; and a power source secured within the hollow casing, the power source secured to the second end of the support rod, a wire electrically secured to the power source and extending outwardly thereof to a push button mechanism.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
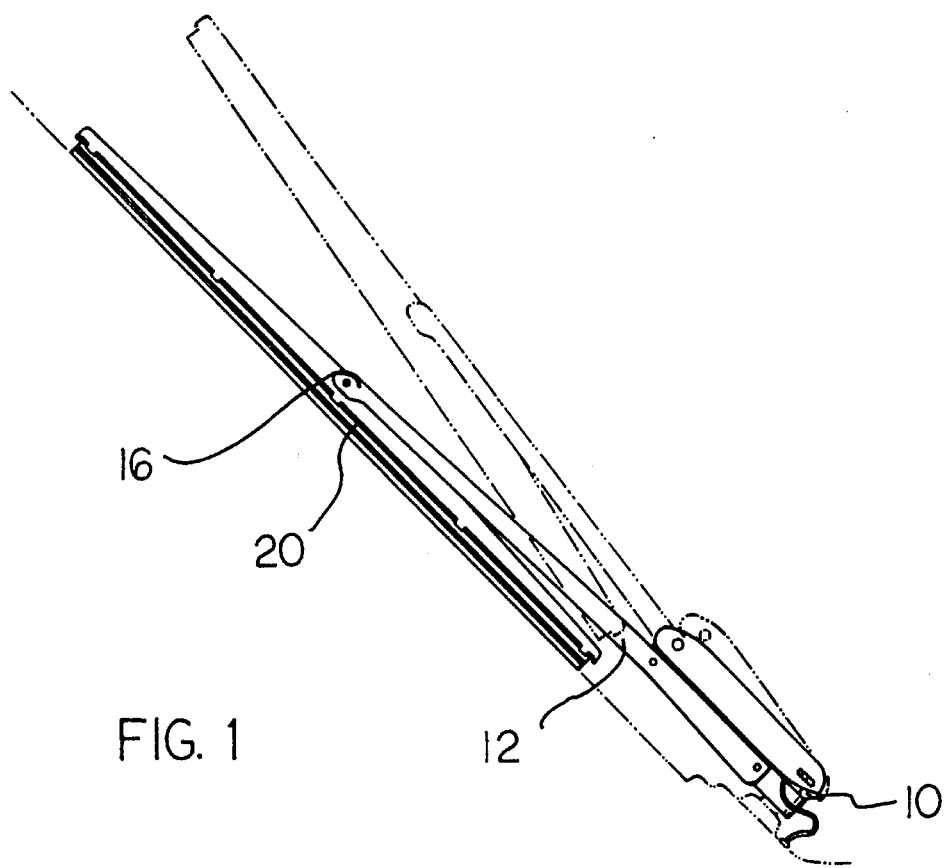
FIG. 1 is a perspective illustration of the preferred embodiment of the mechanical wiper deicer constructed in accordance with the principles of the present invention.
Figure 2:
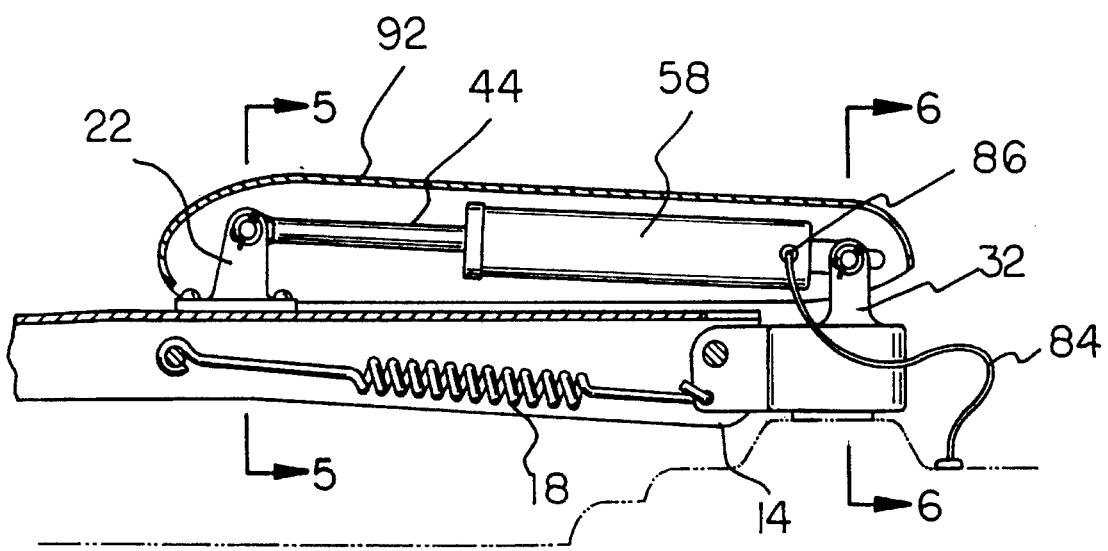
FIG. 2 is a cross-sectional view of the present invention.
Figure 3:
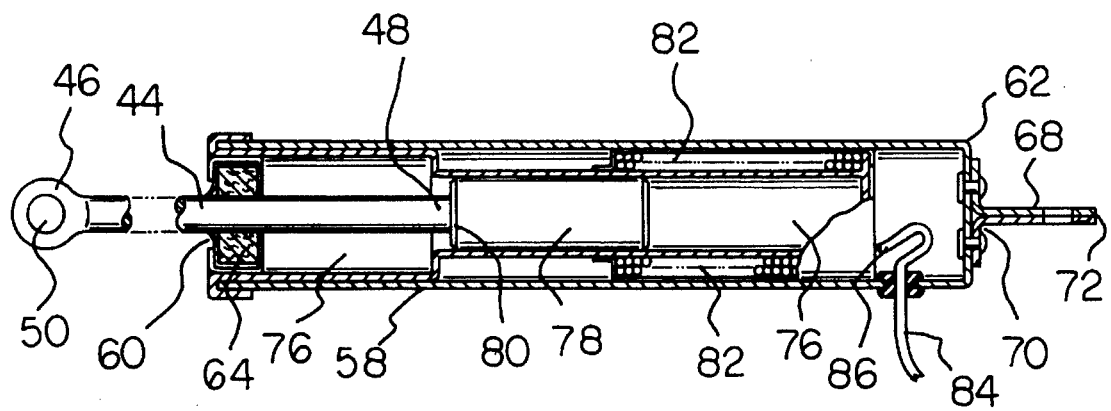
FIG. 3 is a cross-sectional view of the electrical solenoid.
Figure 4:
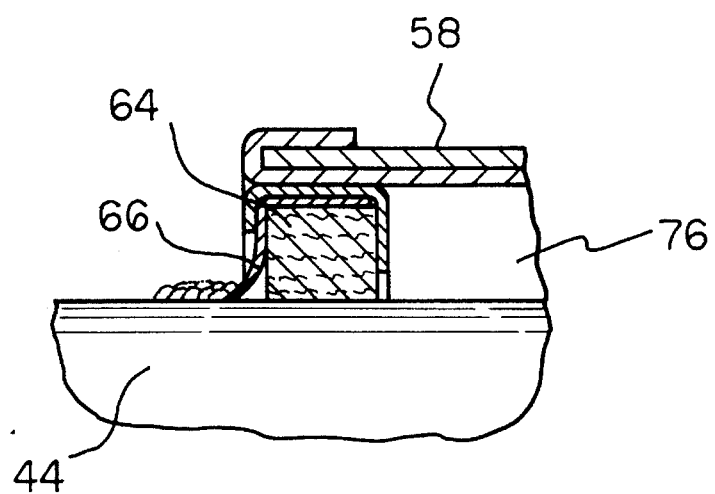
FIG. 4 is an enlarged sectional view of the seal for the electric solenoid.
Figure 5:
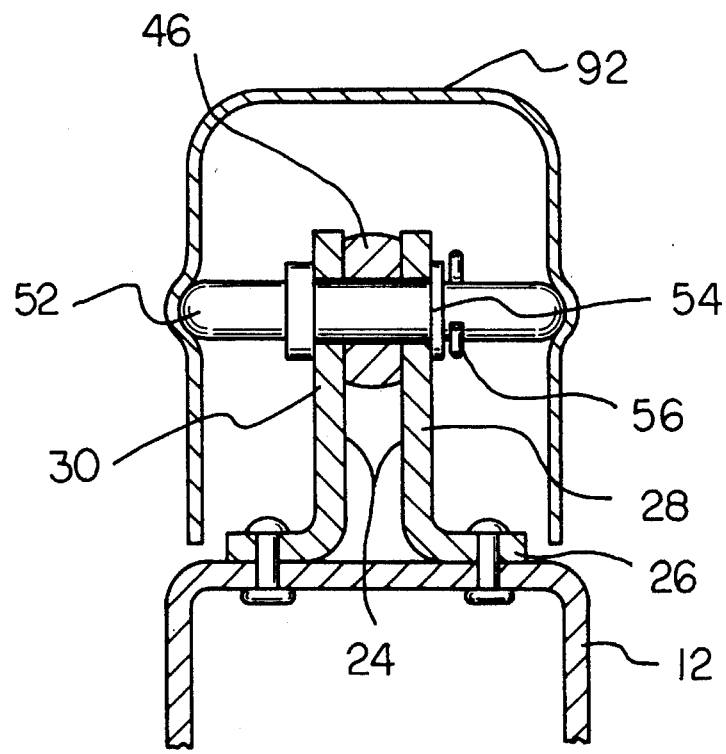
FIG. 5 is a cross-sectional view of taken along line 5—5 of FIG. 2.
Figure 6:
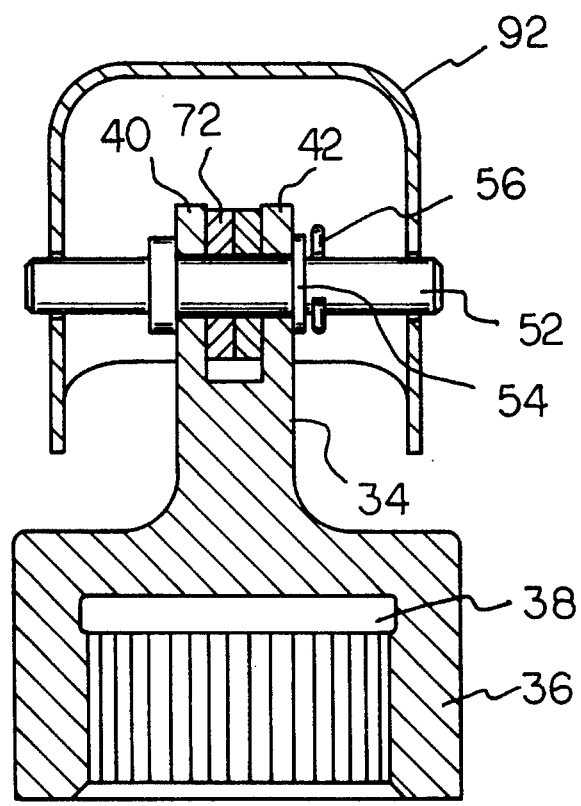
FIG. 6 is a cross-sectional view taken along line 6—6 of FIG. 2.
Figure 7:
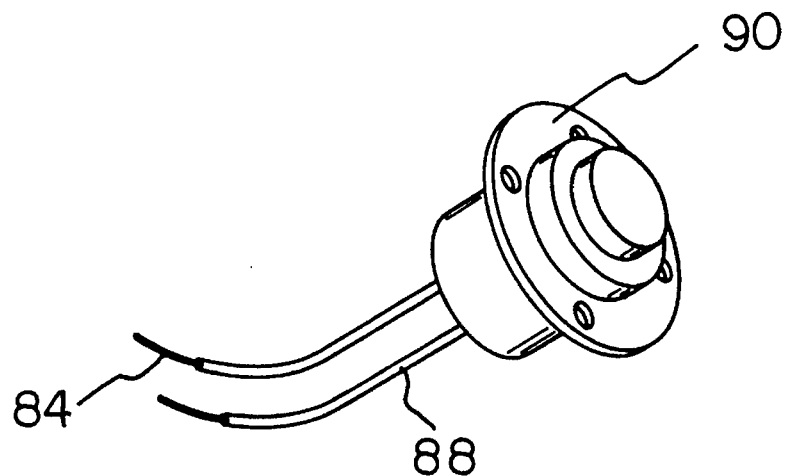
FIG. 7 is a perspective view of the push button attachment for the present invention.
Figure 8:
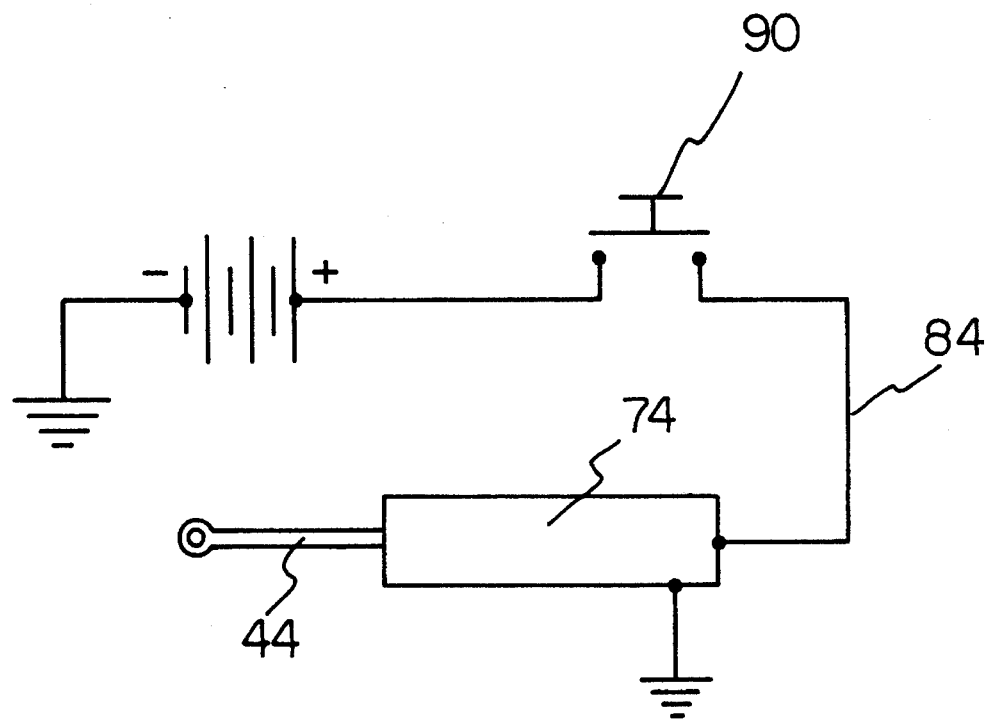
FIG. 8 is an electrical schematic view of the present invention.

With reference now to the drawings, and in particular to FIG. 1 thereof, the preferred embodiment of the new and improved mechanical wiper deicer embodying the principles and concepts of the present invention and generally designated by the reference numeral 10 will be described.

The present invention, the new and improved mechanical wiper deicer is a system 10 comprised of a plurality of components. In their broadest context, the components include a wiper bracket, a first support bracket, a second support bracket, a support rod, an electrical solenoid casing, an electrical solenoid, a push button mechanism, and a protective cover. Each of the individual components is specifically configured and correlated one with respect to the other so as to attain the desired objectives.

The device 10 contains a wiper bracket 12 having a first end 14, a second end 16, and an intermediate extent therebetween. The first end 14 is rotatably secured to a car adjacent the windshield thereof. A retention spring 18 secures the first end 14 to the intermediate extent. A wiper blade 20 attachment is secured to the second end 16.

The device 10 contains a first support bracket 22 having an upper portion 24 and a lower portion 26. The lower portion 26 is secured to the intermediate extent of the wiper bracket 12. The upper portion 24 comprises a first support 28 and a second support 30. The first support 28 and the second support 30 have aligning apertures therethrough.

The device 10 contains a second support bracket 32 having an upper portion 34 and a lower portion 36. The lower portion has a U-shaped spline 38 thereon. The U-shaped spline 38 is adapted for securement to the first end 14 of the wiper bracket 12. The upper portion 34 has a first support 40 and a second support 42. The first support 40 and the second support 42 have aligning apertures therethrough.

The device 10 contains a support rod 44 having a first end 46 and a second end 48. The first end 46 has an aperture 50 formed therethrough. The first end 46 is secured between the first support 28 and the second support 30 of the upper portion 24 of the first support bracket 22 by a fastening means through the aperture 50 of the support rod 44 and the aligning apertures of the first support 28 and the second support 30. The fastening means is preferably comprised of a pin 52, a washer 54, and a cotter pin 56.

The device 10 contains a hollow electrical solenoid casing 58 having an open first end 60 and a closed second end 62. The open first end 60 receives the second end 48 of the support rod 44. A wiper seal 64 and scraper 66 are secured within the open first end 60 adjacent the second end 48 of the support rod 44. The wiper seal is constructed of a felt material and the scraper resembles a sharp metal lip. The seal cleans the support rod 44 while the scraper prevents entry of snow and ice into the casing 58. The casing 58 contains a pivot rod 68 having a first end 70 and a second end 72. The first end 70 is secured to the closed second end 62. The second end 72 is pivotally secured to the first support 40 and the second support 42 of the upper portion 34 of the second support bracket 32 by a fastening means through the aligning apertures thereof and the second end 72 of the pivot rod 68. The fastening means is preferably comprised of a pivot pin 52, a washer 54, and a cotter pin 56.

The device 10 contains an electrical solenoid 74 secured within the hollow electrical solenoid casing 58. The electrical solenoid 74 is comprised of a shaft 76. A movable core 78 is situated within the shaft 76. The movable core 78 has a first end 80, a second end, and an intermediate extent therebetween. The first end 80 is secured to the second end 48 of the support rod 44. A charged coil 82 is electrically secured to the shaft 76. The charged coil 82, when electrified, causes the movable core 78 to shift along the shaft 76, thereby pulling the support rod 44 inward. This, in turn, causes the support rod 44 to pull the first bracket 22 upwards. By raising the first support bracket 22 upwards, the wiper bracket 12 and the wiper blade 20 are thereby lifted off of the surface of the windshield. The retention spring 18 retracts the wiper bracket quickly back into its prone position thereby ridding the blade of any snow or ice accumulated thereon. The procedure can be repeated any number of times until the user is satisfied with the removal of the snow and ice. A wire 84 has a first end 86 and a second end 88, with the first end 86 electrically secured to the charged coil 82. The second end 88 extends outwardly of the solenoid casing 58.

Power may be applied to the device by other sources such as an air cylinder as for vehicles with diesel engines, whether a truck, bus or the like.

The device 10 contains a push button 90 mechanism secured on an inside portion of the car, thereby being accessible to a driver. The push button mechanism 90 is electrically secured to the second end 88 of the wire 84 of the electrical solenoid 74. The push button is simply depressed to activate the device. Pressing the button will cause the charged coil to activate.

A protective cover 92 is removably secured to the first support bracket 22 and the second support bracket 32. The protective cover 92 functions to protect the electrical solenoid 74. The protective cover simply snaps in place over the pivot pins 52 of the support brackets 22, 32.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A windshield wiper assembly including a wiper deicer for eliminating build-up of snow and ice on a thereon said assembly comprising:

an elongated wiper bracket having a first end, a second end, and an intermediate extent therebetween, the first end rotatably mounted on a second support bracket, a retention spring connected to the second support bracket and the intermediate extent, of the wiper bracket a wiper blade attachment secured to the second end of the wiper bracket;

a first support bracket having an upper portion and a lower portion, the lower portion secured to the intermediate extent of the wiper bracket, the upper portion comprising a first support and a second support, the first support and the second support having aligning apertures therethrough;

said second support bracket having an upper portion and a lower portion, the lower portion of the second support bracket having a U-shaped spline thereon, the upper portion of the second support bracket having a first support and a second support, the first support and the second support of the second support bracket having aligning apertures therethrough, the second support bracket adapted to be mounted for rotation on a vehicle.;

a support rod having a first end and a second end, the first end of the support rod having an aperture formed therethrough, the first end of the support rod secured between the first support and the second support of the upper portion of the first support bracket by a first fastening means extending through the aperture of the support rod and the aligning apertures of the first support and the second support of the first support bracket;

a hollow electrical solenoid casing having an open first end and a closed second end, the open first end receiving the second end of the support rod, a wiper seal and scraper secured within the open first end adjacent the second end of the support rod, a pivot rod having a first end and a second end, the first end of the pivot rod secured to the closed second end, the second end of the pivot rod pivotally secured to the first support and the second support of the upper portion of the second support bracket by a second fastening means extending through the aligning apertures thereof and the second end of the pivot rod;

an electrical solenoid secured within the hollow electrical solenoid casing, the electrical solenoid comprising a hollow shaft, a movable core situated within the shaft, the movable core having a first end, a second end, and an intermediate extent therebetween, the first end of the core secured to the second end of the support rod, a coil electrically secured to the shaft, a wire having a first end and a second end, the first end of the wire electrically secured to the charged coil, the second end of the wire extending outwardly of the solenoid casing;

a push button mechanism adapted to be secured on an inside portion of the vehicle thereby being accessible to a driver, the push button mechanism electrically secured to the second end of the wire of the electrical solenoid;

a protective cover removably secured to the first support bracket and the second support bracket, the protective cover functioning to protect the electrical solenoid.

2. The assembly as described in claim 1 wherein the first and second fastening means are comprised respectively of a pivot pin through the aligned apertures, a washer on said pivot pin and a cotter pin through said pivot pin.

* * * * *